United States Patent
Zhang et al.

(10) Patent No.: US 8,996,034 B1
(45) Date of Patent: Mar. 31, 2015

(54) AUTOMATIC VERIFICATION OF CHECK OUT

(71) Applicant: Pact, Inc, San Francisco, CA (US)

(72) Inventors: Yifan Zhang, San Francisco, CA (US); Geoffrey Oberhofer, San Francisco, CA (US)

(73) Assignee: Pact, Inc, San Francisco, CA (US)

( * ) Notice: Subject to any disclaimer, the term of this patent is extended or adjusted under 35 U.S.C. 154(b) by 4 days.

(21) Appl. No.: 13/722,883

(22) Filed: Dec. 20, 2012

(51) Int. Cl.
*H04W 64/00* (2009.01)
*H04W 4/04* (2009.01)

(52) U.S. Cl.
CPC ............... *H04W 4/04* (2013.01); *H04W 64/00* (2013.01)
USPC ............... 455/456.3; 455/456.1; 455/456.6

(58) Field of Classification Search
CPC .................... H04W 64/00; H04W 64/003
USPC .............. 455/456.1, 456.2, 456.3, 456.6
See application file for complete search history.

(56) References Cited

U.S. PATENT DOCUMENTS

| | | | | |
|---|---|---|---|---|
| 5,889,492 | A * | 3/1999 | Kurby et al. | 342/357.52 |
| 8,060,113 | B2 * | 11/2011 | Contractor | 455/456.1 |
| 2007/0032225 | A1 * | 2/2007 | Konicek et al. | 455/417 |
| 2007/0283277 | A1 * | 12/2007 | Hayakawa | 715/748 |
| 2009/0161639 | A1 * | 6/2009 | Ostergren | 370/338 |
| 2011/0063138 | A1 * | 3/2011 | Berkobin et al. | 340/988 |
| 2011/0320583 | A1 * | 12/2011 | Parker et al. | 709/224 |
| 2014/0149032 | A1 * | 5/2014 | Barrett et al. | 701/409 |

* cited by examiner

*Primary Examiner* — Wayne Cai
*Assistant Examiner* — Said Elnoubi
(74) *Attorney, Agent, or Firm* — Van Pelt, Yi & James LLP

(57) ABSTRACT

A system for automatically checking out comprises a processor and a memory. The processor is configured to determine whether a coarse location is within an auto check out location. The processor is further configured to, in the event that the coarse location is not within the auto check out location, determine whether a fine location is within an auto check out location. The processor is further configured to, in the event that the fine location is not within the auto check out location, determine whether a timer time is greater than a minimum time. The processor is further configured to, in the event that the timer time is greater than the minimum time, indicate automatically a check out. The memory is coupled to the processor and is configured to provide the processor with instructions.

18 Claims, 17 Drawing Sheets

AUTOMATIC VERIFICATION OF CHECK OUT

BACKGROUND OF THE INVENTION

Checking in and out of a location is frequently done manually. Sometimes users forget and do not check out after checking in. Sometimes, it is not verified that a user has stayed an entire time at a location. In some cases, accurate location checking drains battery life, especially in mobile devices.

BRIEF DESCRIPTION OF THE DRAWINGS

Various embodiments of the invention are disclosed in the following detailed description and the accompanying drawings.

FIG. 16 is a flow diagram illustrating an embodiment of a process for checking in.

DETAILED DESCRIPTION

Figure 1:
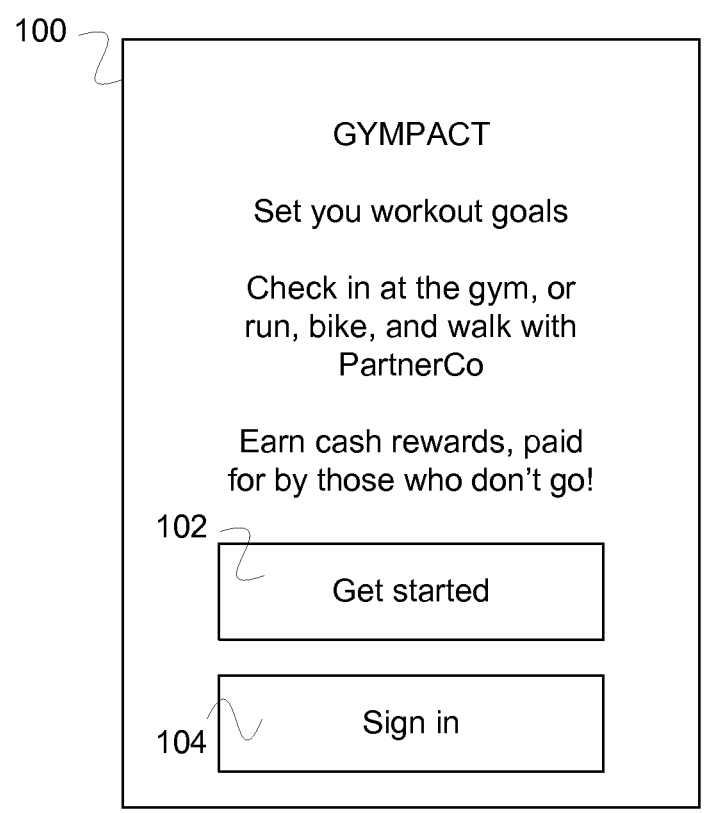
FIG. 1 is a block diagram illustrating an embodiment of a user interface for a system for auto check out.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatically checking out is disclosed. The system comprises a processor and a memory. The processor is configured to determine whether a coarse location is within an auto check out location. The processor is further configured to, in the event that the coarse location is not within the auto check out location, determine whether a fine location is within an auto check out location. The processor is further configured to, in the event that the fine location is not within the auto check out location, determine whether a timer time is greater than a minimum time. The processor is further configured to, in the event that the timer time is greater than the minimum time, indicate automatically a check out. The memory is coupled to the processor and is configured to provide the processor with instructions.

In some embodiments, the system for automated check out is a system for automatically checking a user out after a check in. The system uses a location determination that has a coarse location determination and a fine location determination to save battery power. The location determination is used to determine whether the location is within or without a check out location or bounded area. In the event that the user moves outside of the check out location or bounded area, the user is considered for an automated check out. In some embodiments, the user is automatically checked out in the event that the user moves out side the check out location or bounded area. A timer is started after check in, the timer is checked when considering an automated check out. In some embodiments, in the event that the timer measures a time greater than a minimum time, the automated checkout is processed and an indication is provided indicating that the minimum time was achieved. In some embodiments, the total time on the timer is provided for the user or for logging. In some embodiments, in the event that the timer measures a time less than a minimum time, the automated checkout is processed and an indication is provided indicating that the minimum time was not achieved. In some embodiments, the fine location determination is performed when the coarse location determination indicates that the user is no longer within the auto check out location (e.g., an area that is: within a boundary, outside of a radius around a center coordinate, outside of a boundary, inside a radius around a center coordinate, etc.). In some embodiments, a fine location determination is performed on a periodic basis.

In some embodiments, the auto check out system provides accurate detection of location, time of attendance, while trying to prevent harmful draining of the battery.

In various embodiments, the auto check out location comprises a self-improvement location (e.g., a health activity location, a gym, a fitness center, a doctor's office, a physical training office, a clinic, or an addiction center, etc.), a work site, an office site, a mining site, a forestry site, a construction site, a hiking area, a climbing area, a camping area, a park area, a conference site, an entertainment venue, a sport venue, a parking site, a school area, a home area, a camp area, a retail site, a car sharing lot, a bike sharing location, a vehicle sharing location, an allowed roaming area, or any other appropriate location.

The following description will describe the auto check out system in the context of a system for incentivizing exercise, but it should be readily apparent to one practiced in the art that the system for auto check out works for many different locations other than exercising location.

In some embodiments, a check in and an auto check out system is used to track whether a user succeeds (e.g., checks in to an exercise location and is auto checked out according to a self-set goal, etc.) or does not succeed in meeting a goal of an incentive system. The system for providing incentive or motivation uses both a positive (e.g., carrot) and negative (e.g., stick) incentives for a user. For example, a user is rewarded if a goal is met and punished if the goal is not met. The goal is set by a user for a time period (e.g., a number of days in a week with a work out; 1, 2, 3, 4, 5, 6, or 7 days with a workout in the upcoming week, etc.). The stake is set by a user for a time period (e.g., money that is paid out by the user automatically based on whether the user satisfies the goal). In the event a participant does not meet his/her goal, the stakes for the unsuccessful participant are collected into a reward pool. The reward pool, with contributions from all unsuccessful group participants, is then distributed to the successful participants of the group. In various embodiments, the distribution share to each of the successful participants of the group comprises one of the following: an equal share, a share proportional to the participant's individual goal, or any other appropriate share. In some embodiments, the stake of the unsuccessful participant is scaled to the amount that the participant misses his/her goal (e.g., stake is $10 per missed gym work out).

In various embodiments, the auto check out system runs on a mobile computing device (e.g., a mobile phone, a cell phone, a tablet, etc.), a network computer (e.g., a computer device located at a gym, a computer device located at home, etc.), or any other appropriate system. In some embodiments, the auto check out system runs on a device that includes a processor, a display, a touch screen interface, a memory, and a network interface.

FIG. 1 is a block diagram illustrating an embodiment of a user interface for a system for auto check out. In the example shown, window 100 shows a screen for starting with the system for providing incentive. The screen offers the proposition of setting a workout goal, checking in at a gym, or run, bike, or walk with PartnerCo (e.g., a partner company), and earn cash rewards paid for by those who do not meet their workout goal. Window 100 includes button 102 for getting started and button 104 for signing in.

Figure 2:
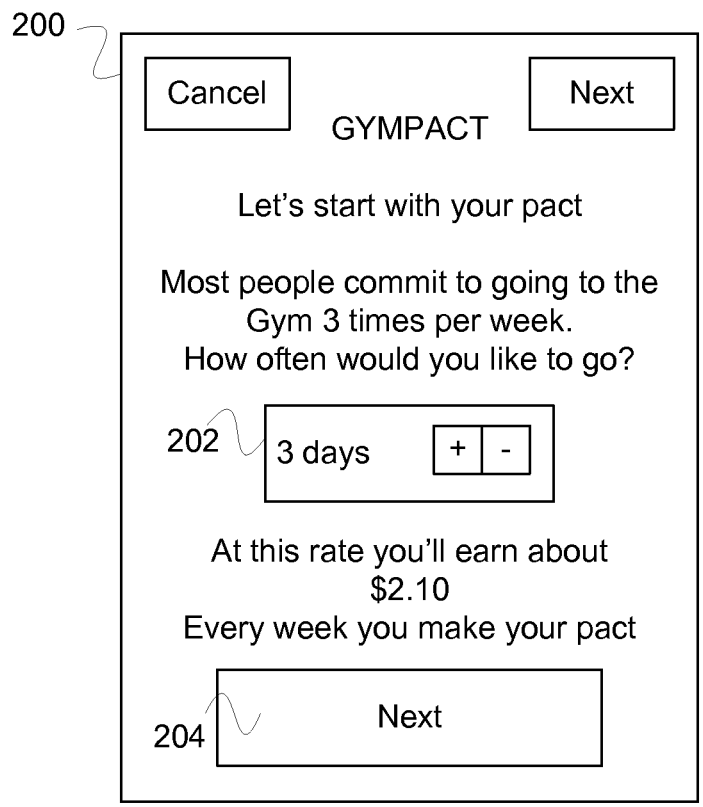
FIG. 2 is a block diagram illustrating an embodiment of a user interface for a system for auto check out.

FIG. 2 is a block diagram illustrating an embodiment of a user interface for a system for auto check out. In the example shown, window 200 shows a screen for setting a goal for a participant. The screen indicates that a participant or user can start their pact. The screen indicates that most people commit to going to the gym 3 times per week and asks the user to say how often they would like to go. Display element 202 shows the number of days and provides a user with the ability to set the number of days (e.g., with '+' and '−' buttons). The screen indicates based at least in part on the number of days selected an estimate for the positive incentive (e.g., $2.10) that the user will earn for each time period (e.g., a week). The estimate is based at least in part on an estimate on the number of users that will not succeed with their individual goal and an estimate of the amount that each of the unsuccessful users will contribute to the reward pool. In some embodiments, the estimate is based on a past history of the reward pool. Window 200 includes button 204 for moving to the next window.

Figure 3:
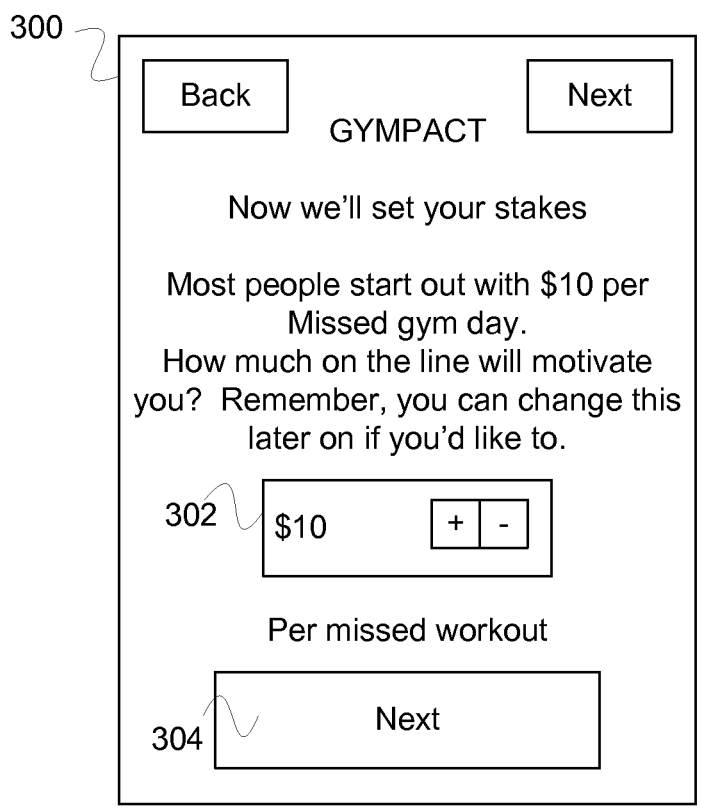
FIG. 3 is a block diagram illustrating an embodiment of a user interface for a system for auto check out.

FIG. 3 is a block diagram illustrating an embodiment of a user interface for a system for auto check out. In the example shown, window 300 shows a screen for setting a stake for a participant. The screen indicates that the most people start out with a stake of $10 per missed gym day. The screen asks how much the participant wishes to put on the line to motivate the participant to meet their goal. The participant is reminded that the stake can be changed at a later time. Display element 302 shows a stake amount (e.g., $10 per missed workout) and provides a user with the ability to set the stake amount (e.g., with '+' and '−' buttons). Window 300 includes button 304 for moving to the next window. Window 300 also includes a button for moving to a previous window.

Figure 4:
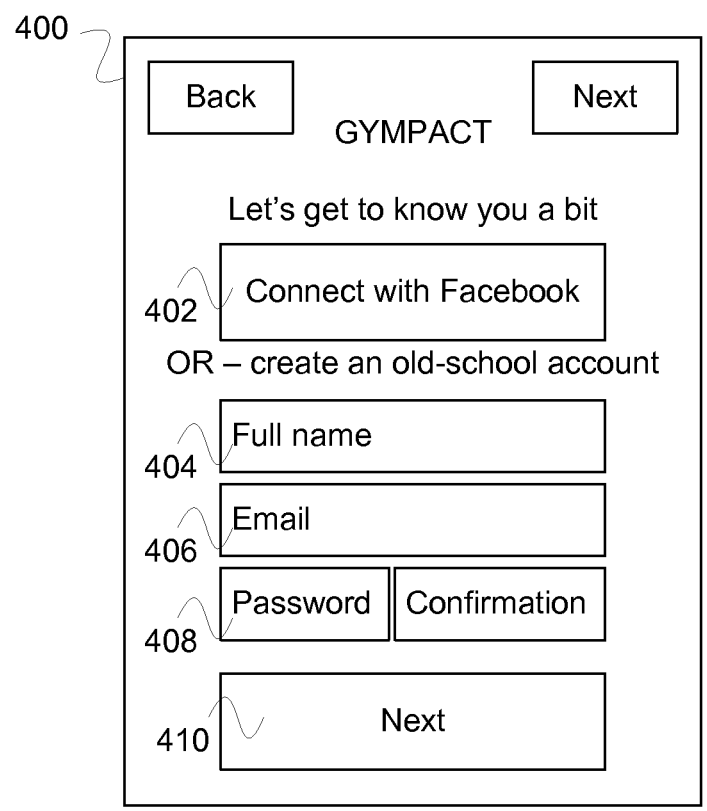
FIG. 4 is a block diagram illustrating an embodiment of a user interface for a system for auto check out.

FIG. 4 is a block diagram illustrating an embodiment of a user interface for a system for auto check out. In the example shown, window 400 shows a screen for creating an account. The screen displays text asking to get to know the participant. Button 402 requests a connection with facebook. In some embodiments, information regarding the participant is gathered using a connection with a social media site (e.g., facebook). Display element 404 enables a participant or user to enter their full name for starting an account. Display element 406 enables a user to enter their email address. Display element 408 enables a participant to enter a password. Window 400 includes button 410 for moving to the next window. Window 400 also includes a button for moving to a previous window.

Figure 5:
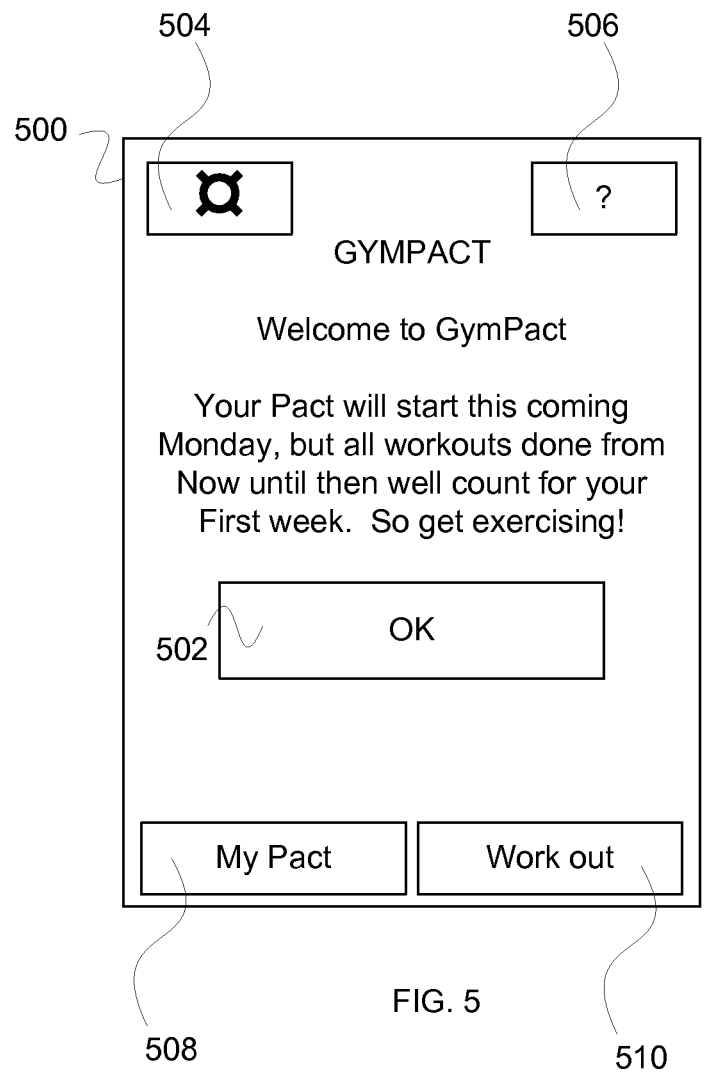
FIG. 5 is a block diagram illustrating an embodiment of a user interface for a system for auto check out.

FIG. 5 is a block diagram illustrating an embodiment of a user interface for a system for auto check out. In the example shown, window 500 shows a screen for starting using the system. The screen displays a greeting welcoming the participant and indicates that the pact will start in the coming week (e.g., starting Monday). As an initial head start, for the first period workouts done prior to the start day of the period count toward the period's goal. Window 500 includes button 502 acknowledging the start of the pact. Button 504 accessing settings for the account. Button 506 accesses on-line help or a frequently asked question screen. Button 508 accesses the pact (e.g., the goal, the stake, access to being able to edit the goal and/or stake, etc.). Button 510 is for checking in to start a workout.

Figure 6:
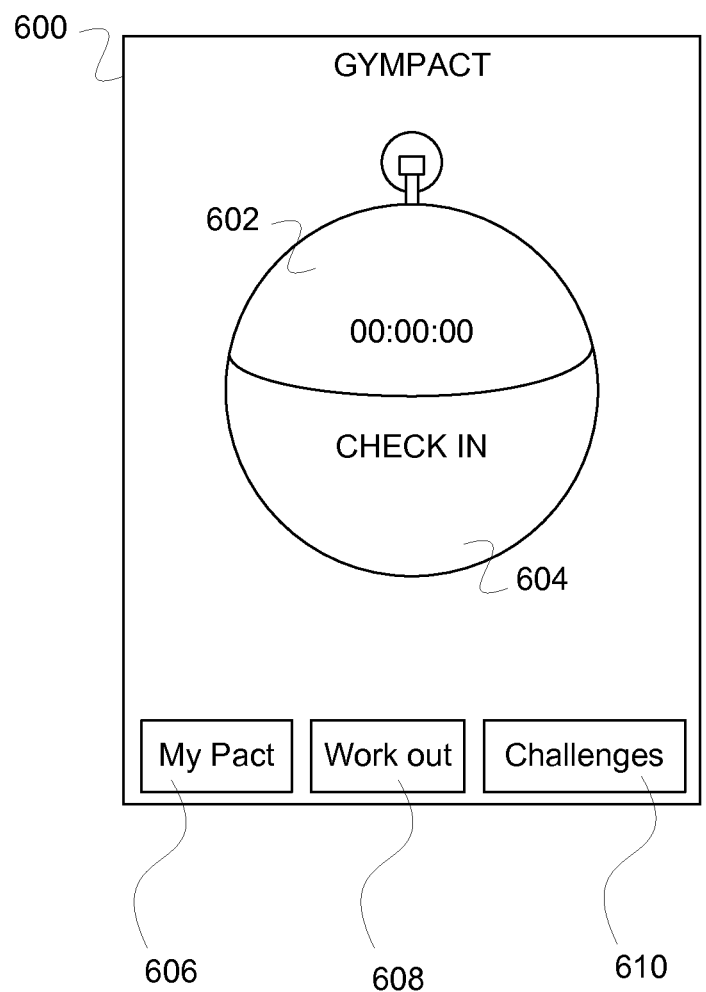
FIG. 6 is a block diagram illustrating an embodiment of a user interface for a system for auto check out.

FIG. 6 is a block diagram illustrating an embodiment of a user interface for a system for auto check out. In the example shown, window 600 shows a screen for checking in using the system. The screen displays timer 602 for timing a workout and button 604 for checking in to a workout (e.g., starting the workout at a gym). In some embodiments, the checking in is verified (e.g., verifying that the participant is at a gym location). In various embodiments, verification uses a location of the device being used to check in (e.g., location of a device, terminal, mobile device, stationary computer, etc.), cellular tower location or triangulation, wireless connectivity location, global positioning system location, gym desk check in, or any other appropriate verification. Window 600 includes button 606 for accessing a pact (e.g., a stake, a goal, editing a stake, editing a goal, setting a break, etc.); button 608 for starting a workout (e.g., getting to window 606); button 610 for viewing challenges (e.g., special challenges or rewards).

Figure 7:
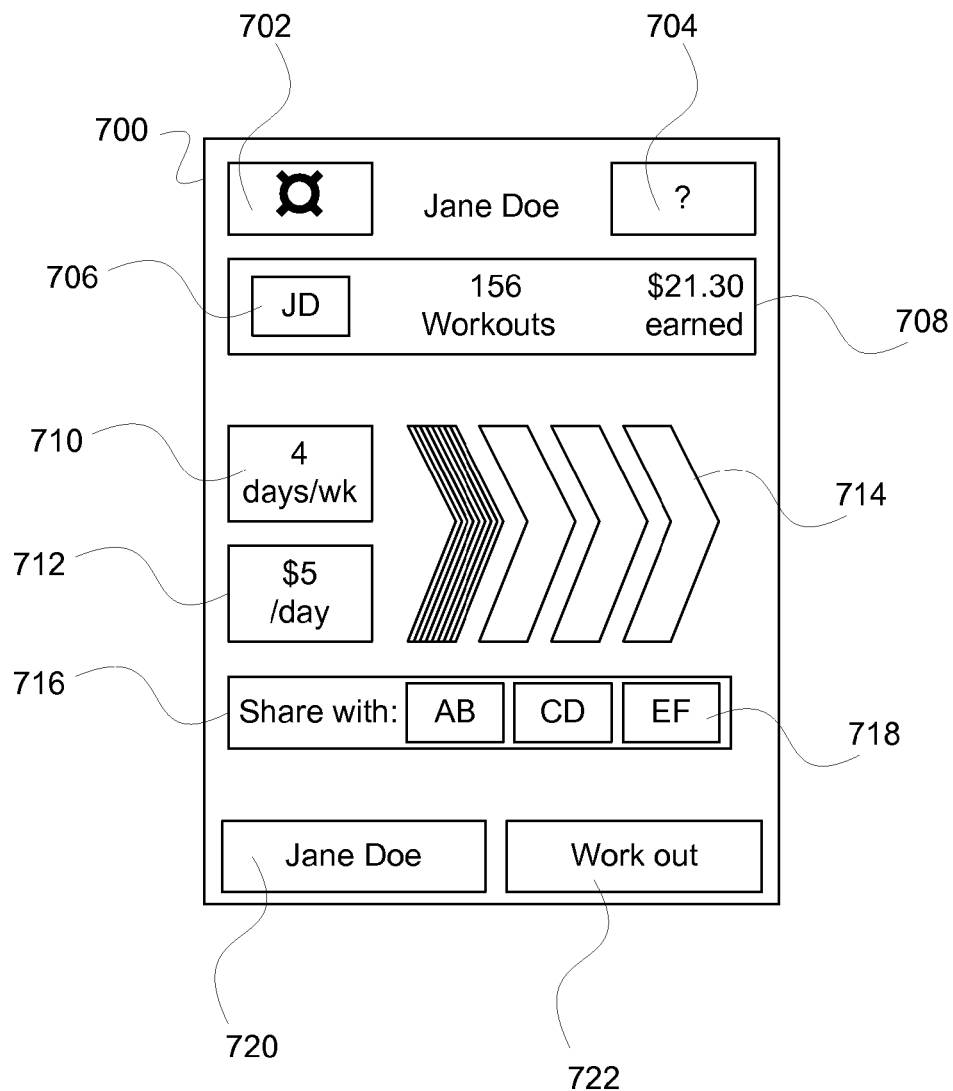
FIG. 7 is a block diagram illustrating an embodiment of a user interface for a system for auto check out.

FIG. 7 is a block diagram illustrating an embodiment of a user interface for a system for auto check out. In the example shown, window 700 shows a screen for status for a user of the system for providing incentive. Button 702 enables a user to access settings. Button 704 enables a user to access on-line help. Display element 706 identifies the user (e.g., with initials, with a photo, with a user icon, etc.). Display element 708 displays status of past number of achievements or failures (e.g., workouts completed—for example, 156 workouts, successful goals met, workouts missed, goals not met, etc.) and positive incentives earned or negative incentives paid (e.g., cumulative shares of rewards—for example, $21.30 earned, cumulative stakes paid, etc.). Display element 710 displays goal for participant (e.g., 4 days/week of working out). Display element 712 displays stake for participant (e.g., $5/day to be paid for each missed workout). Display element 714 displays completed portion of goal (e.g., 1 work out of the 4 using a striped element to indicate completed and a non-striped element to indicate not completed workouts). Display element 716 displays users to share status with (e.g., users AB, CD, EF 718 indicated using initials, icons, or pictures). Button 720 enables a user to access their pact. Button 722 enables a user to access their workout.

Figure 8:
FIG. 8 is a block diagram illustrating an embodiment of a user interface for a system for auto check out.

FIG. 8 is a block diagram illustrating an embodiment of a user interface for a system for auto check out. In the example shown, window 800 shows a screen for congratulating a user of the system for providing incentive. The screen indicates that the participant has completed 4 workouts last week and that the participant earned $3.59. Button 802 enables a user to proceed to a next screen.

Figure 9:
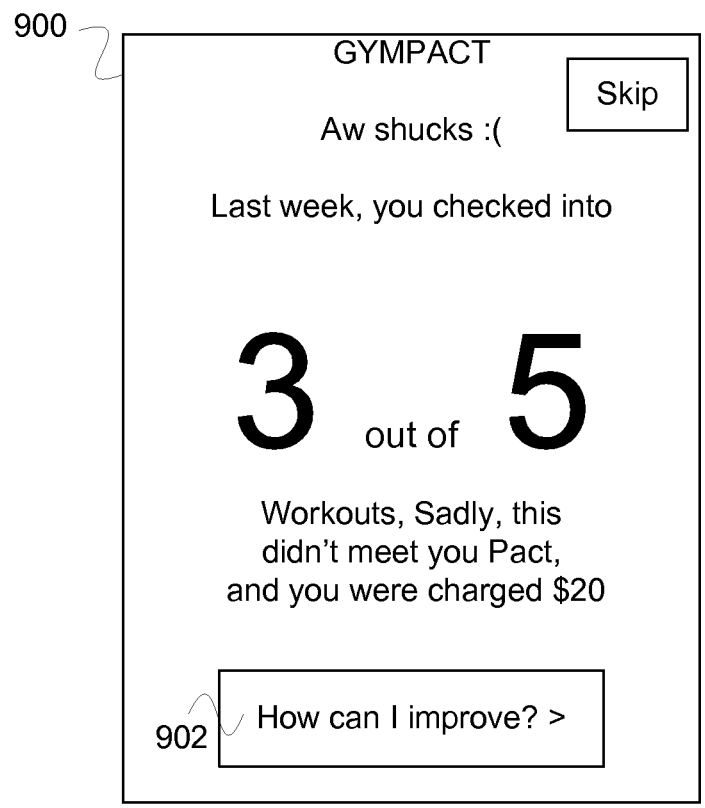
FIG. 9 is a block diagram illustrating an embodiment of a user interface for a system for auto check out.

FIG. 9 is a block diagram illustrating an embodiment of a user interface for a system for auto check out. In the example shown, window 900 shows a screen for informing a user of their failure to meet their goal. The screen indicates that the participant has completed 3 out of 5 workouts last week and that the participant has paid according to their stake into the reward pool. Button 902 enables a user to proceed to a next screen and, for example, learn how to better meet their goal next week. Window 900 also has a button for skipping to a different screen.

Figure 10:
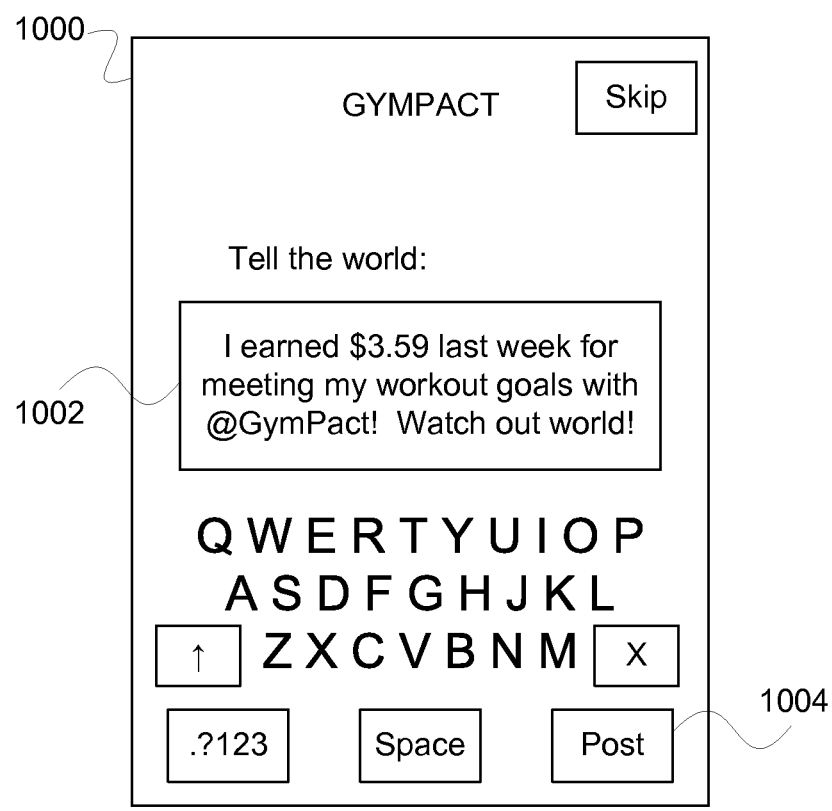
FIG. 10 is a block diagram illustrating an embodiment of a user interface for a system for auto check out.

FIG. 10 is a block diagram illustrating an embodiment of a user interface for a system for auto check out. In the example shown, window 1000 shows a screen for informing others about the participant's success. Display element 1002 enables a user to type a message—for example, that the user earned a reward (e.g., $3.59). Window 1000 includes button 1004 to post the message (e.g., to a social media site, to twitter, to facebook, etc.). Window 1000 also includes a button to skip to a next screen.

Figure 11:
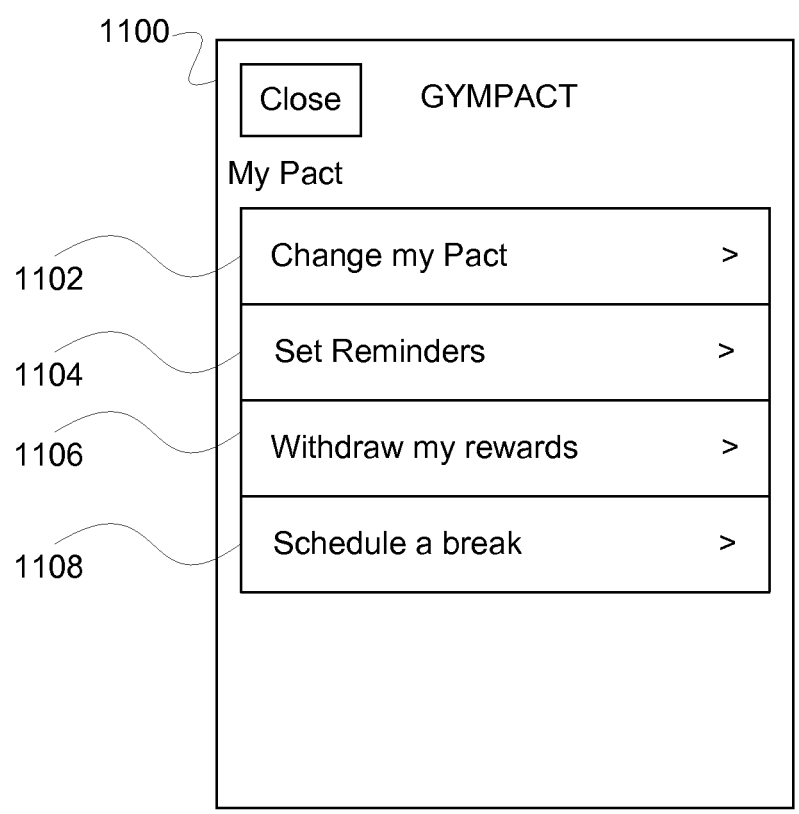
FIG. 11 is a block diagram illustrating an embodiment of a user interface for a system for auto check out.

FIG. 11 is a block diagram illustrating an embodiment of a user interface for a system for auto check out. In the example shown, window 1100 shows a screen for settings. Display element 1102 enables a user to change the pact (e.g., change goal, change stake). In some embodiments, a user is only able to change the pact for a next time period not the current time period (e.g., next week, next month, etc.). Display element 1104 enables a user to set reminders (e.g., a message or alarm reminding the user to workout, go to the gym, etc.). Display element 1106 enables a user to withdraw rewards (e.g., a user can transfer the rewards to a separate account, to PayPal, to a bank account, etc.). In some embodiments, a withdrawal has a minimum amount requirement before a withdrawal is possible. Display element 1108 enables a user to schedule a break from the pact. In various embodiments, the break comprises a break from the pact for next week, a break from the pact starting on a date, a break from the pact starting on a start date and continuing until an end date, a break starting on a start date and continuing indefinitely, or any other appropriate break. In some embodiments, a user is only able to schedule a break starting in a next period (e.g., next week). Window 1100 includes a button to close the screen (e.g., returning to a prior screen).

Figure 12A:
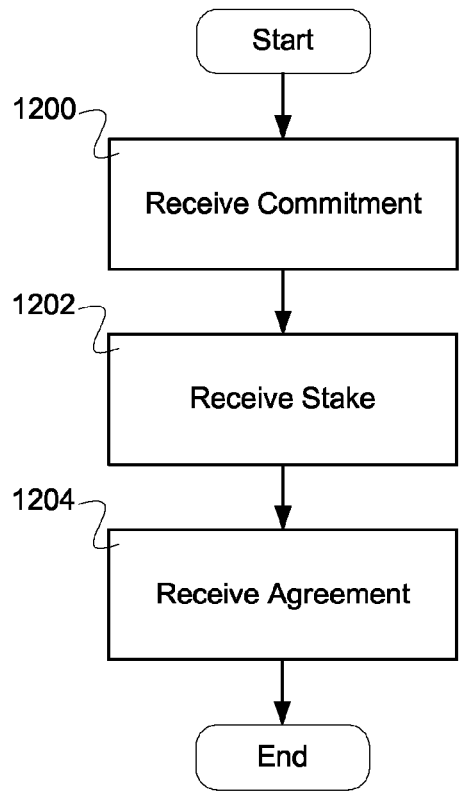
FIG. 12A is a flow diagram illustrating an embodiment for a process for auto check out.

FIG. 12A is a flow diagram illustrating an embodiment for a process for auto check out. In the example shown, in 1200, a commitment is received. For example, a goal is received from a user or participant. In 1202, a stake is received. For example, a negative incentive is received (e.g., that commits a user to pay for each missed goal element such as a workout missed). In 1204, an agreement is received. For example, a user agrees to the pact of the goal and the stake by a user indicating to agree with the pact (e.g., by hitting a button on a screen or providing a click on a screen interface or verbally indicating agreement, etc.).

Figure 12B:
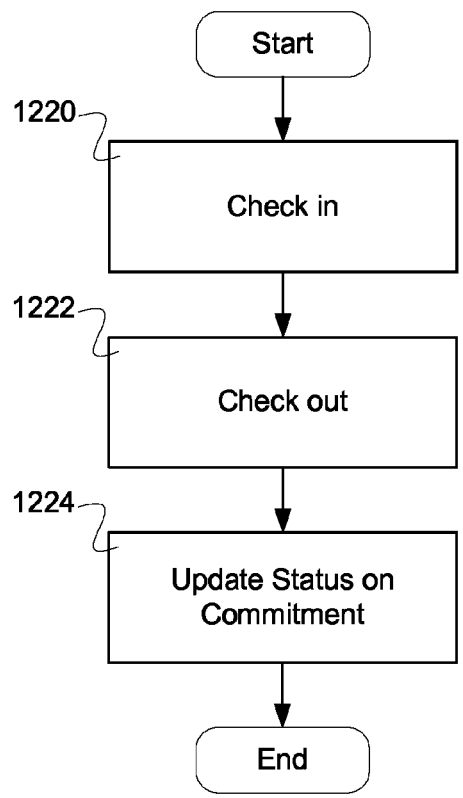
FIG. 12B is a flow diagram illustrating an embodiment for a process for auto check out.

FIG. 12B is a flow diagram illustrating an embodiment for a process for auto check out. In the example shown, in 1220 a user checks in. For example, a user indicates using a button push on a touch screen or a click of a mouse that the user is checking in to start a workout. In various embodiments, the check in is verified using the location of the device used for checking in, the location of a cell tower, the location of a WiFi router, or any other appropriate verification of location. In 1222, a user checks out. For example, a user indicates using a button push on a touch screen or a click of a mouse that the user is checking out to end a workout. In some embodiments, there is a minimum time required before checkout is allowed (e.g., a minimum workout time of 30 minutes is required before the workout counts). In 1224, the status is updated on the commitment. For example, a user's status or progress towards the goal of the time period is updated (e.g., the number of workouts for a user is updated for the week and the progress toward the user's goal is updated and displayed).

Figure 13:
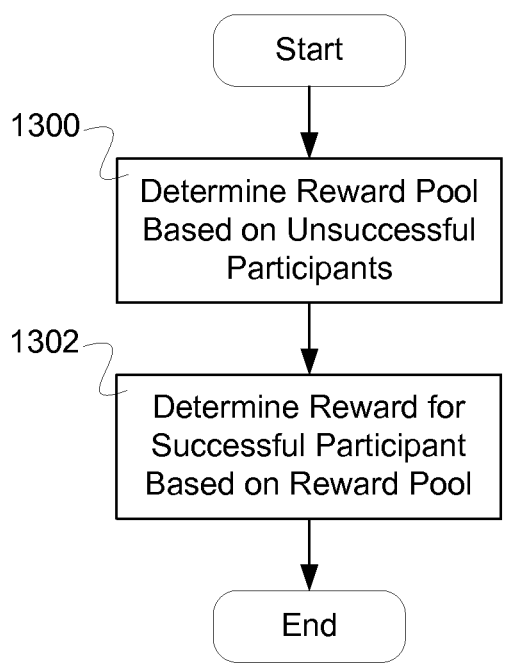
FIG. 13 is a flow diagram illustrating an embodiment for a process for auto check out.

FIG. 13 is a flow diagram illustrating an embodiment for a process for auto check out. In the example shown, in 1300 a reward pool is determined based on unsuccessful participants. For example, the stake for an unsuccessful person is taken and pooled (e.g., a stake of $x per missed workout is charged to the preauthorized credit card stored on file and the money is pooled in a reward pool). In various embodiments, stake is taken using a PayPal account, a gift card, a bank transfer, or any other payment method. In 1302, a reward is determined for a successful participant based on the reward pool. For example, the reward pool is split up among the successful participants who met their goal (e.g., the successful participants get a cut of the pool scaled to their commitment or goal size). In some embodiments, the scaling is one share per day commitment per week.

Figure 14:
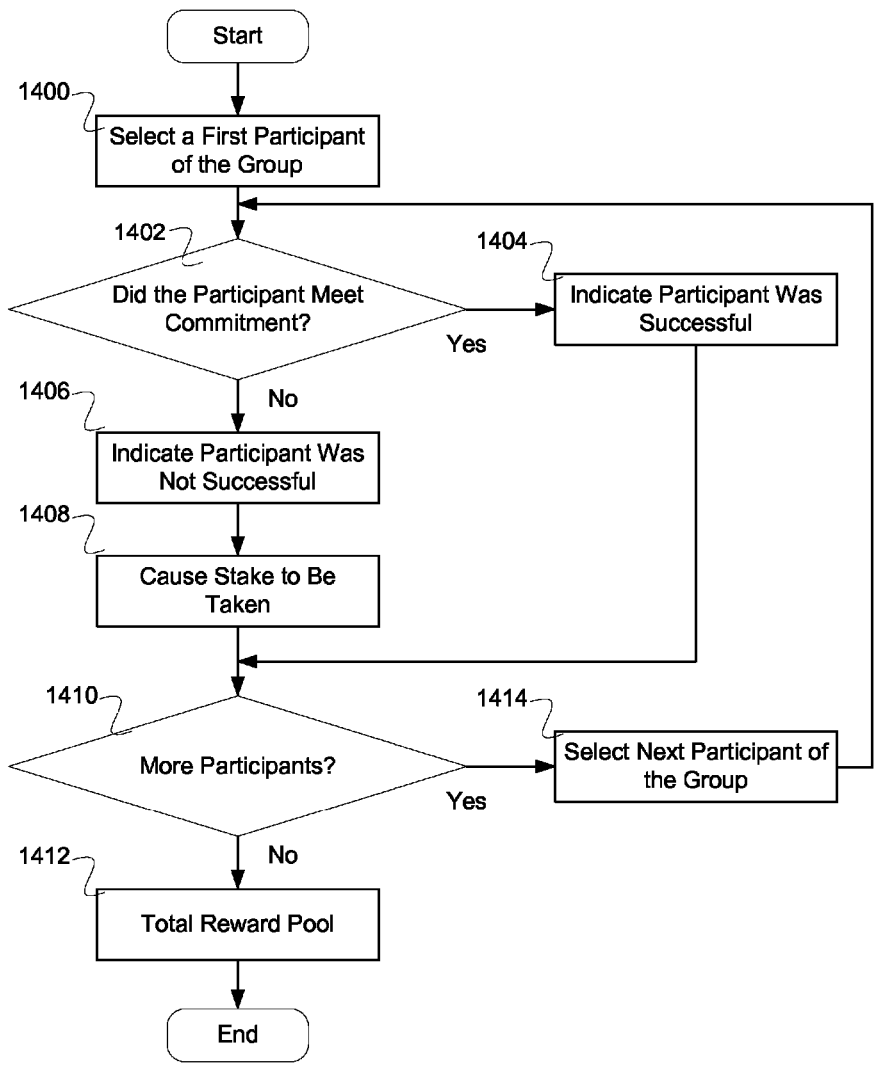
FIG. 14 is a flow diagram illustrating an embodiment of a process for auto check out.

FIG. 14 is a flow diagram illustrating an embodiment of a process for auto check out. In some embodiments, the process of FIG. 14 is used to implement 1300 of FIG. 13. In the example shown, in 1400 a first participant of the group is selected. In 1402, it is determined whether the participant met his/her commitment. In the event that the participant was successful, control passes to 1410. In the event that the participant was not successful, in 1406 it is indicated that the participant was not successful. In 1408, the stake is caused to be taken. For example, determine the number of missed workouts and the stake per workout, charge the participant for the workouts missed. In 1410, it is determined whether there are more participants. For example, see if there are any participants of a group that have not yet had a determination as to their success or lack of success and then had their stake debited. In the event that there more participants, in 1414 select a next participant of the group and control passes to 1402. In the event that there are no more participants, then in 1412 total the reward pool. For example, add all of the debits from the unsuccessful participants (e.g., the stakes taken from participants) to make a total reward pool.

Figure 15:
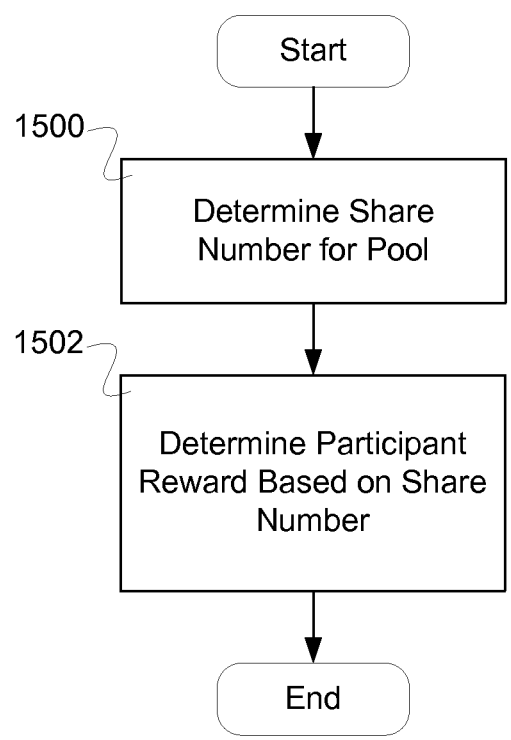
FIG. 15 is a flow diagram illustrating an embodiment of a process for auto check out.

FIG. 15 is a flow diagram illustrating an embodiment of a process for auto check out. In some embodiment, the process of FIG. 15 is used to implement 1302 of FIG. 13. In the example shown, in 1500 a share number is determined for the pool. In various embodiments, the share number comprises one share for each participant, one share for each day committed by each participant, or any other appropriate share number. In 1502, a participant reward is determined based on the share size. For example, the reward for a participant is equal to the share number associated with the participant times the reward pool divided by the total number of shares for all participants.

Figure 16:
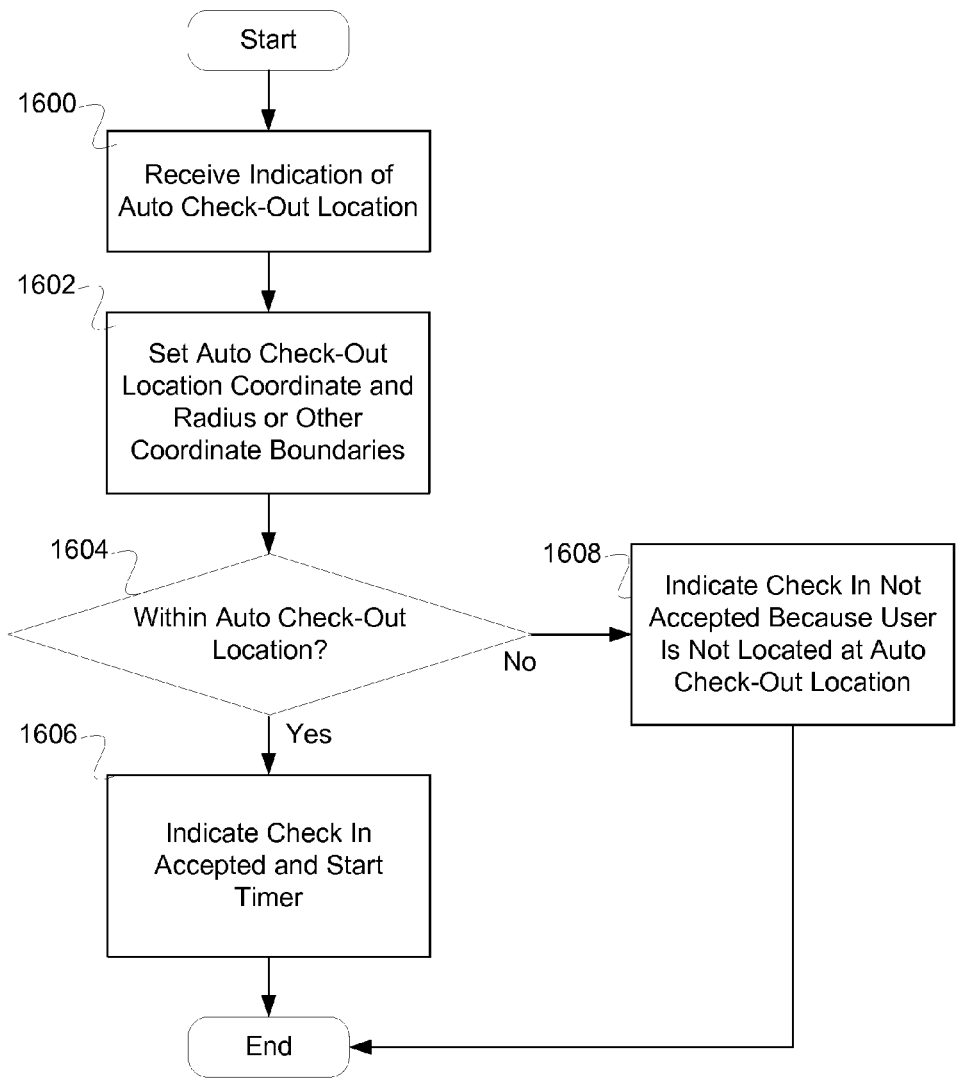

FIG. 16 is a flow diagram illustrating an embodiment of a process for checking in. In the example shown, in 1600 an indication is received of an auto check-out location. In 1602, an auto checkout location coordinate and radius or other coordinate boundaries are set. In 1604, it is determined whether the location is within the auto check-out location. In the event that the location is within the auto check-out location, in 1606, indicate that the check in is accepted and a timer is started. In the event that the location is not within the auto check-out location, in 1608, indicate that the check in is not accepted because user is not located at auto check-out location.

Figure 17:
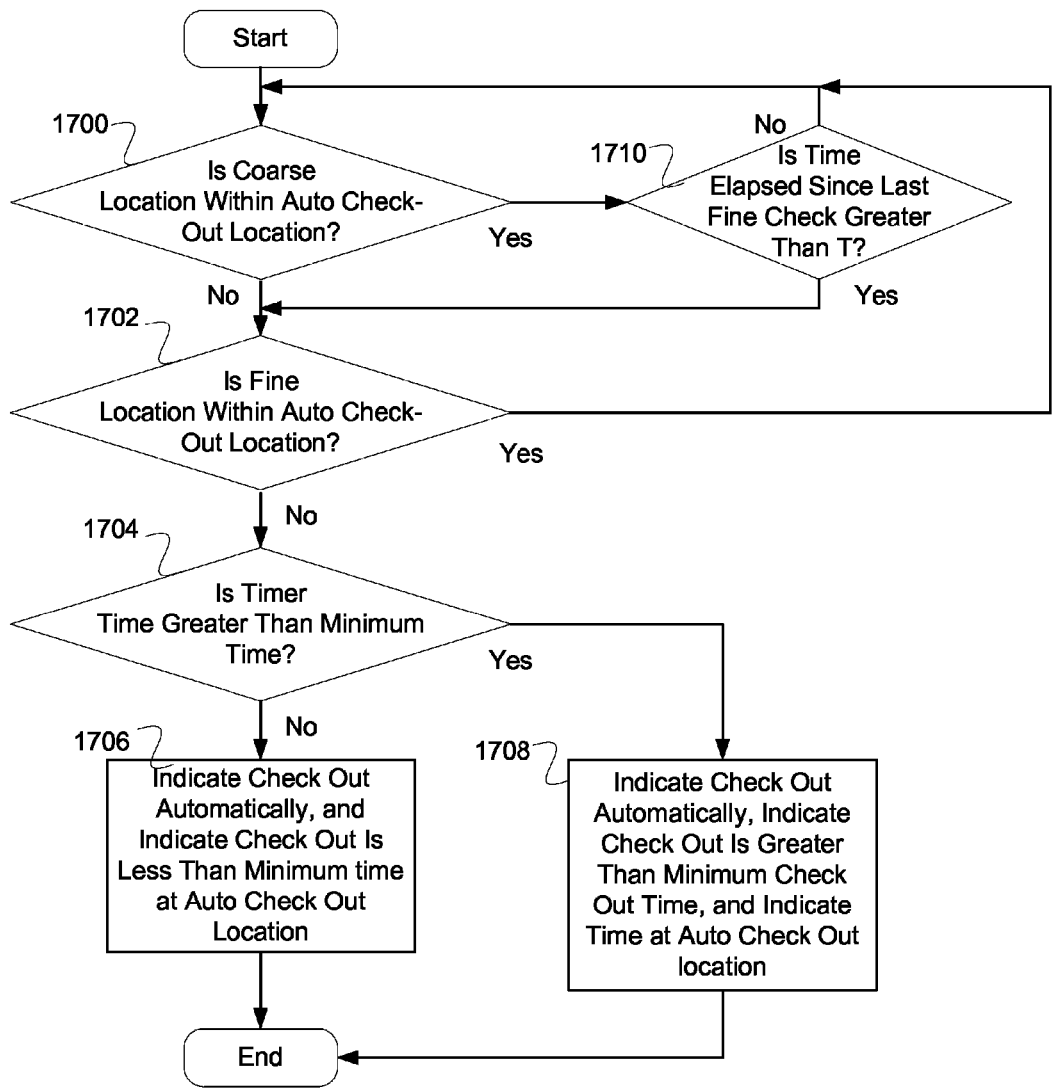
FIG. 17 is a flow diagram illustrating an embodiment of a process for auto check out.

FIG. 17 is a flow diagram illustrating an embodiment of a process for auto check out. In the example shown, in 1700 it is determined whether a coarse location is within the auto check-out location. In the event that the coarse location is within the auto check-out location, then in 1710, it is determined whether the time elapsed since last fine check is greater than T. For example, the time T is 5 minutes or 10 minutes, where the time is set to preserve battery life. In the event that it is determined that the time is less than T, control passes to 1700. In the event that it is determined that the time is greater than T, then control passes to 1702. In the event that coarse location is not within the auto check-out location, in 1702, it is determined whether a fine location is within an auto check-out location. In the event that the fine location is within the auto check-out location, then control passes to 1700. In the event that the fine location is not within the auto check-out location, in 1704 it is determined whether the timer time is greater than the minimum time. In the event that the timer time is greater than the minimum time, then indicate to check out automatically, indicate that the workout is greater than minimum work out time, and indicate the total time at auto check out location. In the event that the timer time is less than the minimum time, then indicate check out automatically, indicate workout is not greater than minimum time, and indicate the total time at auto check out location.

In some embodiments, in the event that the timer is not greater than the minimum time and the fine location is not in the auto check out location (e.g., outside of the radius or outside the boundary, inside the radius or inside the boundary, etc.), a cancellation is indicated. In some embodiments, the cancellation indicates that the time after checking in does not count toward a goal or a checked in time.

In various embodiments, the coarse location or the fine location is determined using global positioning system, a wifi transmitter location, one or more cellular tower locations (e.g., using the tower location itself, triangulating between the towers to identify a better location, etc.), or any other appropriate location determination.

In some embodiments, the auto check out system is used to check out of, verify, and monitor time spent at a fitness center. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and monitor time spent at a doctor's office or physical training location. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and monitor time spent at a clinic, weight watcher center, addiction or help center location, etc. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and monitor time spent at a work or office location for an employee. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and monitor that an employee or client left a site safely—this can be used in mining, forestry, construction, park, camp area, hiking area, climbing area, etc. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and attendance at an event, like a conference, a sports event, an entertainment event, an entertainment park, etc. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the auto check out system is used to check out of, verify, and attendance at an event, like a conference, a sports event, an entertainment event, an entertainment park, etc. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In various embodiments, the check out system is used to notify of a vacant spot at a sporting event, concert, club, or any other appropriate location or event In various embodiments, the auto check out system is used to check out of, verify, and monitor use of a parking space, a work space, a shared space, parking space, a slip, a warehouse space, a city area, a city environs, a neighborhood, or any other appropriate space or area. The location of the system (e.g., location of a mobile phone device, a system receiving device location information, etc.) is determined and used to establish whether the location is in a check out location (e.g., within a set of boundaries, within a radius of a coordinate, outside a set of boundaries, outside a radius round a coordinate, etc.). In the event that the system is still within the check out location, the user is not checked out. In the event that the system is not within the check out location, the user is automatically checked out. In some embodiments, the user needs to stay within the check out location for a minimum time after checking in for an acceptable checkout to be achieved.

In some embodiments, the system is used to make sure that children or teenagers stay in certain areas for a period of time—for example, an event, at home, at sports, at camp, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for automatically checking out, comprising:
an auto-check out system that monitors a time spent of a user at an auto check out location, wherein the auto-check out system comprises a mobile device associated with a user and a network computer, wherein the auto-check out system comprises a processor configured to:
determine whether a coarse location is within the auto check out location;
in the event that the coarse location is within the auto check out location, determine whether a time elapsed since a last fine location check is greater than a fine check time;
in the event that the coarse location is not within the auto check out location, determine whether a fine location is within an auto check out location;
in the event that the fine location is not within the auto check out location, indicate an automatic check out, wherein the automatic check out indicates that the mobile device associated with the user has physically left the auto check out location, and determine whether the time spent of the user at the auto check out location is greater than a minimum time, wherein the time spent of the user comprises a timer started after the mobile device associated with the user has entered the auto check out location;
in the event that the time spent is greater than the minimum time, indicate the time spent of the user at the auto check out location is greater than the minimum time; and
a memory coupled to the processor and configured to provide the processor with instructions.

2. A system as in claim 1, wherein the processor is further configured to determine whether a coarse location is within an auto check out location in the event that the time elapsed since the last fine location check is not greater than the fine check time.

3. A system as in claim 1, wherein the processor is further configured to determine whether a fine location is within an auto check out location in the event that the time elapsed since the last fine location is greater than the fine check time.

4. A system as in claim 1, wherein the fine check time comprises a time selected to extend a battery life.

5. A system as in claim 1, wherein the processor is further configured to indicate that the time spent is not greater than the minimum time at the auto check out location in the event that the timer time is not greater than the minimum time.

6. A system as in claim 5, wherein the processor is further configured to indicate a cancellation.

7. A system as in claim 1, wherein the processor is further configured to indicate the time spent of the user at the auto check out location.

8. A system as in claim 1, wherein the auto check out location comprises a self-improvement location.

9. A system as in claim 8, wherein the self-improvement location comprises one of the following a gym, a fitness center, a doctor's office, a physical training office, a clinic, or an addiction center.

10. A system as in claim 1, wherein the auto check out location comprises one or more of the following: a work site, an office site, a mining site, a forestry site, a construction site, a hiking area, a climbing area, a camping area, a park area, a conference site, an entertainment venue, a sport venue, a parking site, a school area, a home area, a camp area, and a retail site.

11. A system as in claim 1, wherein the auto check out location is defined as an area inside of a boundary or inside of a radius around a coordinate.

12. A system as in claim 11, wherein the auto check out location comprises one or more of the following: a car sharing lot, a bike sharing location, a vehicle sharing location, and an allowed roaming area.

13. A system as in claim 1, wherein the coarse location or the fine location is determined using a global positioning system.

14. A system as in claim 1, wherein the coarse location or the fine location is determined using a wifi transmitter location.

15. A system as in claim 1, wherein the coarse location or the fine location is determined using one or more cellular tower locations.

16. A system as in claim 15, wherein the one or more cellular tower locations are used to triangulate the coarse location or the fine location.

17. A method for automatically checking out, comprising:
    determining, using a processor of an auto-check out system that monitors a time spent of a user at an auto check out location, whether a coarse location is within the auto check out location;
    in the event that the coarse location is within the auto check out location, determine whether a time elapsed since a last fine location check is greater than a fine check time;
    in the event that the coarse location is not within the auto check out location, determining whether a fine location is within an auto check out location;
    in the event that the fine location is not within the auto check out location, indicating an automatic check out, wherein the automatic check out indicates that the mobile device associated with the user has physically left the auto check out location, and determining whether the time spent of the user at the auto check out location is greater than a minimum time, wherein the time spent of the user at the auto check out location comprises a timer started after the mobile device associated with the user has entered the auto check out location; and
    in the event that the time spent is greater than the minimum time, indicating the time spent of the user at the auto check out location is greater than the minimum time.

18. A computer program product for automatically checking out, the computer program product being embodied in a non-transitory computer readable storage medium and comprising computer instructions for:
    determining using an auto-check out system that monitors a time spent of a user at an auto-check out location, whether a coarse location is within the auto check out location;
    in the event that the coarse location is within the auto check out location, determine whether a time elapsed since a last fine location check is greater than a fine check time;
    in the event that the coarse location is not within the auto check out location, determining whether a fine location is within an auto check out location;
    in the event that the fine location is not within the auto check out location, indicate an automatic check out, wherein the automatic check out indicates that the mobile device associated with the user has physically left the auto check out location, and determining whether the time spent of the user at the auto check out location is greater than a minimum time, wherein the time spent of the user comprises a timer started after the mobile device associated with the user has entered the auto check out location; and
    in the event that the time spent is greater than the minimum time indicating the time spent of the user at the auto check out location is greater than the minimum time.

\* \* \* \* \*